W. A. TURBAYNE.
ELECTRICAL SYSTEM OF DISTRIBUTION.
APPLICATION FILED JULY 11, 1908.
991,107.
Patented May 2, 1911.
2 SHEETS—SHEET 1.
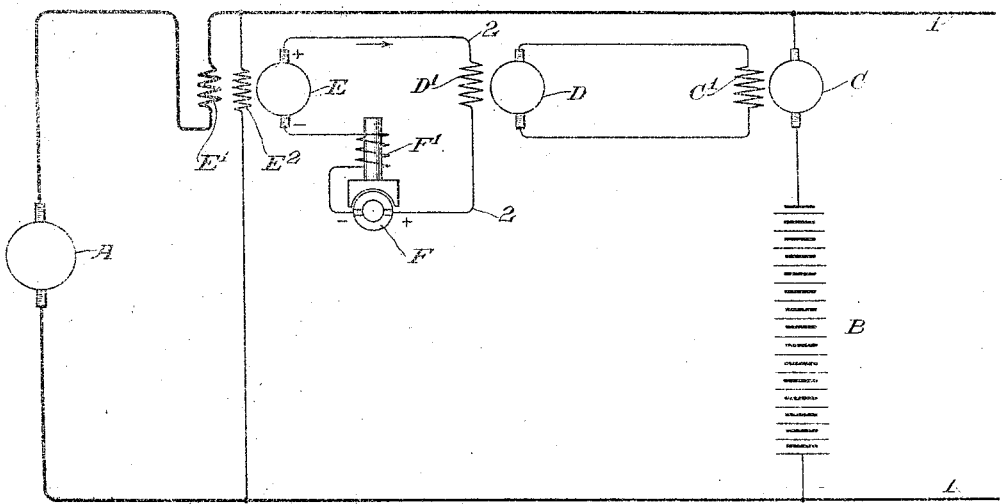
Fig. 1
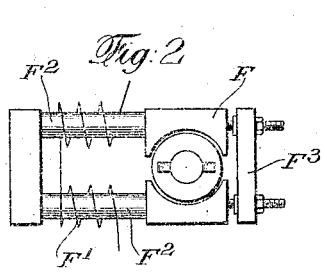
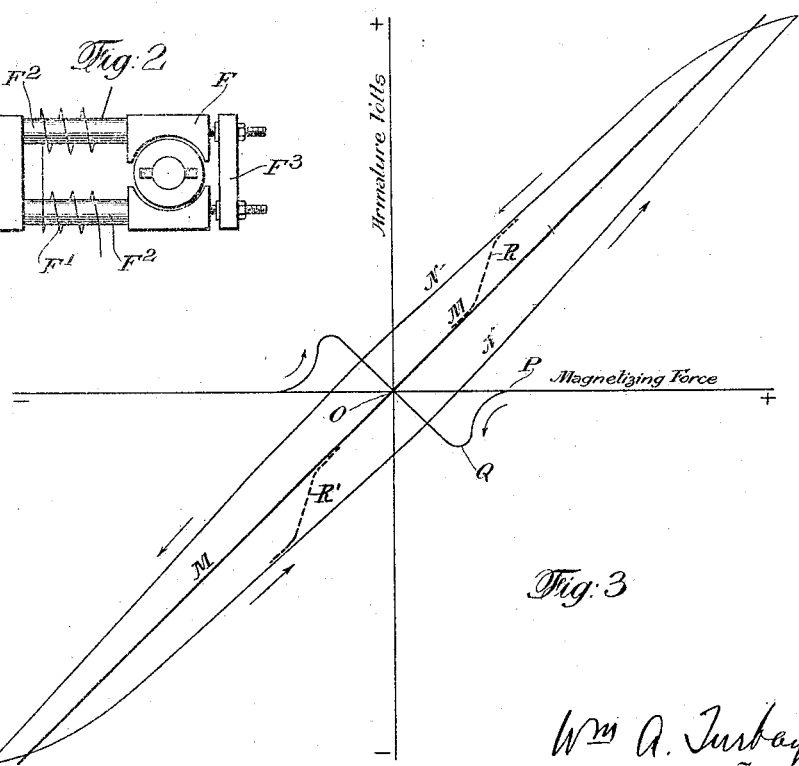
Fig. 2
Fig. 3
Witnesses:
Geo. M. Harris
John E. Gemper
Wm. A. Turbayne
Inventor
By his Attorneys Kenyon & Kenyon

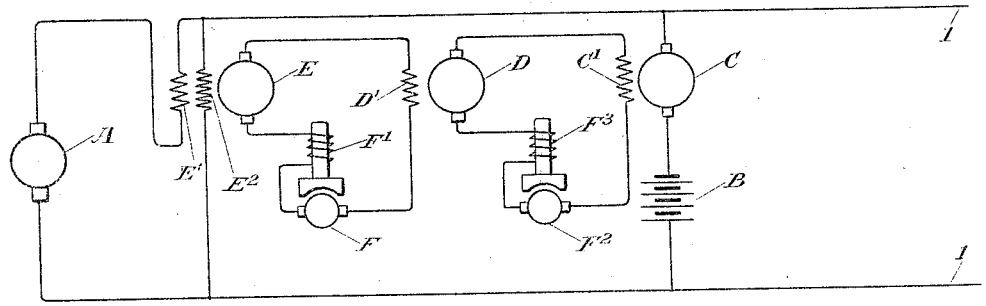
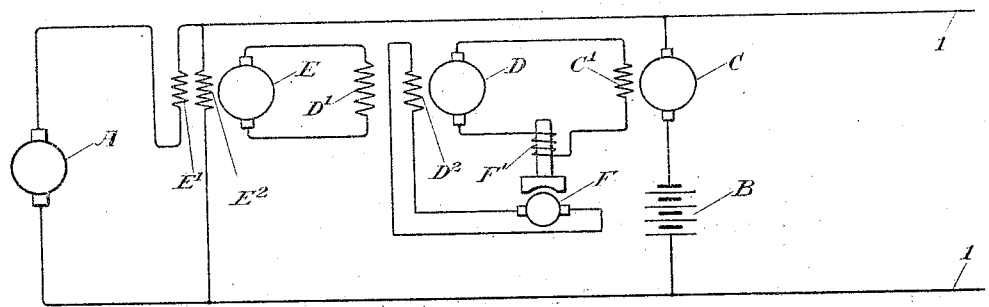

UNITED STATES PATENT OFFICE.

WILLIAM A. TURBAYNE, OF LANCASTER, NEW YORK, ASSIGNOR TO GOULD STORAGE BATTERY COMPANY, A CORPORATION OF NEW YORK.

ELECTRICAL SYSTEM OF DISTRIBUTION.

991,107.  Specification of Letters Patent.  Patented May 2, 1911.

Application filed July 11, 1908. Serial No. 443,161.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and more especially to systems in which a regulating dynamo or booster is used to regulate the action of a storage battery to compensate for fluctuations on the system, and to systems similar thereto. In such systems the regulating machine is caused to pass through various cycles of magnetization and in so doing its action is retarded because of hysteresis or the lag of the magnetization behind the impressed voltage. Consequently when the impressed voltage reaches zero the magnetization has not reached zero and the machine fails to come to its neutral condition as it otherwise theoretically should. Such action causes the battery or other regulating means to lag in its regulating action and so causes more or less of the fluctuations to fall upon the main generator.

The main object of my invention is to provide an arrangement whereby the magnetization is made more responsive to the impressed regulating voltage and whereby the lag due to such hysteresis is materially eliminated.

In carrying out my invention I provide a dynamo-electric machine for acting upon the field of the regulating dynamo, in conjunction with the usual exciter. Said dynamo-electric machine is opposed to said exciter and its field is made more or less responsive to the action of said exciter. In general I prefer the arrangement to be such that as the impressed voltage on the regulating machine is carried toward zero, said opposing dynamo-electric machine acts to cause the magnetization of the regulating machine to conform exactly or more closely to the impressed regulating voltage. In the construction of said dynamo-electric machine I prefer in general to use in the magnetic circuit, material having a great deal of remanence, such as hard steel. The machine will therefore lag very greatly behind its impressed voltage and be caused to have its opposing action predominate as the main regulating impressed voltage approximates zero. I also prefer to have the magnetic circuit of this machine arranged to become quickly and easily saturated so that its opposing action will not materially affect the regulation.

Further and more specific features and advantages of my invention will appear from the detailed description given below taken in connection with the accompanying drawing, in which—

Figure 1 shows diagrammatically a system embodying one form of my invention; Fig. 2 is a detail diagrammatic view of one form of my new dynamo-electric machine, and Fig. 3 is a plot showing, in exaggerated form, a hysteresis loop, and the magnetization effect of my improved dynamo-electric machine. Figs. 4 and 5 are modifications of the system shown in Fig. 1.

Referring to Fig. 1, A represents a main generator supplying the distribution circuit, I, I. Connected across the distribution circuit is a storage battery B, and in series therewith a booster C provided with a field C'. The field C' is connected to a regulating dynamo D for its excitation, and the regulating dynamo D, is provided with a field D' which is connected in a circuit 2, 2, with the armature of another regulating dynamo or exciter E. The exciter E is provided with opposing field coils E' and E², the coil E' being in series in the distribution circuit, I, I, and the coil E² being a voltage coil connected across the circuit, I, I. Each of the machines C, D and E is provided with any suitable and well-known driving means. When the system is operating under normal conditions the magneto-motive forces produced by the opposing coils, E' and E² are equal and hence there is no resulting field flux for the exciter E. Therefore the exciter will furnish no excitation to the regulating dynamo D, and the regulating dynamo D, will furnish no excitation to the booster C. Under these conditions the booster will run idly and the battery will float across the circuit, I, I.

If an increase in current occurs in the distribution circuit I, I, the coil E' will predominate over the coil E² and a flux will be set up in the exciter or dynamo E which will cause it to furnish an exciting regulating current to the regulating dynamo D, which in turn will excite the booster C. This regulating current will be in such a direction that the booster C will generate an electromotive force to aid the battery B and cause it to discharge into the distribution circuit, I, I, and take the extra load thereon. Similarly, if a decrease in current takes place in the distribution circuit the regulating machines E and D cause the booster to generate an electromotive force in opposition to the battery so that it will take current from the distribution circuit, I, I, and become charged. It will thus be seen that the regulating dynamo D is caused to pass through various cycles of magnetization and in the usual sort of such dynamos it is inherent that the magnetization and armature voltage do not properly respond to the magnetizing force, but lag behind considerably thus causing the booster C to lag considerably in its regulating action. This lagging of the magnetization, or hysteresis, is shown somewhat exaggerated in Fig. 3 in which the line M represents the magnetization or armature volts due to the magnetizing force when there is no lagging or hysteresis, that is, under ideal conditions. In the usual machines, however, the magnetization or armature voltage does not so respond to the magnetizing force but lags behind as shown by the lines N, N'. Thus when the magnetizing force is zero there is considerable residual flux in the dynamo and it will generate a considerable voltage. To eliminate this residual flux I provide in the circuit, 2, 2, a dynamo-electric machine, F, driven from any suitable source of power and having peculiar properties. The machine, F, is provided with a series field F' and is connected in series with the field D' and so as to produce an electromotive force in opposition to that produced in the exciter E. The machine F also has, in its magnetic circuit, material having relatively great remanence and which will become quickly saturated upon the application of a small magnetizing force. To provide for this I preferably wind the field coil F' of the machine F, upon cores of hard steel, represented by the reference character F², (see Fig. 2). These cores have a great deal of remanence and when the magnetizing force is taken away from them they will still retain, as residual flux, most of the original flux.

Consider that an overload on the system is decreasing and the exciting current in the circuit, 2, 2, is accordingly decreasing, then the magnetization of the machine D will decrease much as shown by the line N'. This action continues until the magnetizing force produced by the exciter E becomes equal to the opposing magnetizing force of the machine F, which may be at about the point P. As the voltage of the exciter E decreases further the opposing voltage of machine F predominates, due to the great remanence of its magnetic circuit and the residual flux it therefore contains. The machine F, therefore, causes a demagnetizing effect upon the field D' as the voltage of the exciter E returns to zero and this demagnetizing effect may be represented by the curve Q, for since the machine F is series wound it will at once begin to demagnetize itself so that the magnetization of the machine D will drop from the line N' substantially to the line M along the dotted line R. Thus the actual magnetization will reach substantially zero when the voltage of the exciter E reaches zero. Thus the opposing magnetizing effect of the machine F will have removed all the residual magnetization of the machine D and a curve representing this magnetization would pass through zero at the point O along the line M. Exactly similar operations take place when the magnetizing force of the exciter E is decreased from a negative value, the polarity of the machine F changing whenever the current in the armature of the exciter E changes and the flux falling off along the line R'. In increasing the excitation of the machine D from zero in either direction the machine F merely interposes a small counter electromotive force which affects the magnetization curve of the machine D much as a resistance in series with the field D' would, while at normal load the machine F has substantially no effect.

The action of the dynamo-electric machine F may be adjusted by means of a magnetic shunt which may consist of a bar F³, adjustable to be more or less in the magnetic circuit.

In Fig. 4 I have shown a similar system but with a machine F², similar to the machine F, in series with armature D. The field coil F³ of the machine F is also in series with the armature D, so that the residual flux in fields of booster C may be wiped out.

In Fig. 5 a still further modification is shown, in which the machine F feeds an independent field coil D² upon the machine D, and the field coils F' of the machine F are in series with the machine D.

By the means above described, when the magnetizing force applied to the regulating dynamo D decreases and approaches zero, all the residual flux therein may be wiped out and the dynamo made to furnish the proper regulating current responsive to the fluctuations in the exciter E. The lag due to hysteresis or residual magnetism is obviated and the whole system made extremely sensitive.

I do not desire to be limited to the exact details shown and described since many modifications may be had without departing from the scope of my invention as defined in the appended claims, but

What I claim and desire to secure by Letters Patent of the United States, is:

1. In an electrical system of distribution, the combination of a distribution circuit, a battery connected to said circuit, a dynamo-electric machine for regulating the action of said battery, an exciter for said machine responsive to fluctuations in said circuit and a machine responsive to reversals in the exciter current for opposing its action.

2. In an electrical system of distribution, the combination of a distribution circuit, a battery and regulating apparatus including a booster in operative relation to said circuit, a dynamo for regulating the action of said booster responsive to fluctuations in said circuit and a dynamo-electric machine for opposing the action of said dynamo responsive to reversals of current in said regulating apparatus.

3. In an electrical system of distribution, the combination of a distribution circuit, a main generator therefor, a battery connected across said circuit, regulating apparatus including a regulating dynamo for said battery, a dynamo for governing the action of said regulating dynamo and having opposing field coils, one of which carries a current which varies responsively to the current in said circuit, and a third dynamo for acting upon said regulating dynamo responsive to reversals of current in said regulating apparatus.

4. In an electrical system of distribution, the combination of a distribution circuit, a storage apparatus connected to said circuit, a regulating dynamo therefor, an exciter for said regulating dynamo, and a dynamo-electric machine for acting upon the field of said regulating dynamo responsive to fluctuations in said circuit.

5. In an electrical system of distribution, the combination of a distribution circuit, a battery in operative relation thereto, a regulating dynamo for said battery, an exciter for said regulating dynamo, and a series wound dynamo-electric machine for acting upon the field of said regulating dynamo.

6. In an electrical system of distribution, the combination of a distribution circuit, a battery in operative relation thereto, a regulating dynamo for said battery, an exciter for said regulating dynamo and a dynamo-electric machine for acting upon the field of said regulating dynamo, said machine having field windings in series with its armature and having a magnetic circuit of pronounced remanence as compared with said regulating dynamo and exciter.

7. In an electrical system of distribution, the combination of a distribution circuit, a battery in operative relation thereto, a regulating dynamo for said battery, an exciter for said regulating dynamo, and a dynamo-electric machine for acting upon the field of said regulating dynamo responsive to certain fluctuations in said circuit and means for regulating the action of said machine.

8. In an electrical system of distribution, the combination of a distribution circuit, a battery in operative relation thereto, a regulating dynamo for said battery, an exciter for said regulating dynamo, and a dynamo-electric machine for acting upon the field of said regulating dynamo and means for varying the reluctance of the magnetic circuit of the field of said machine.

9. In an electrical system of distribution, the combination of a distribution circuit, a battery in operative relation thereto, a regulating dynamo for said battery, an exciter for said regulating dynamo, and a dynamo-electric machine for acting upon the field of said regulating dynamo, said machine having field windings in series with its armature and a magnetic circuit of pronounced remanence as compared with said regulating dynamo, and means for regulating the action of said machine.

10. In an electrical system of distribution, the combination of a regulating dynamo, an exciter in series with the field thereof and a dynamo-electric machine acting upon said field responsive to fluctuations in said exciter.

11. In an electrical system of distribution, the combination of a regulating dynamo, an exciting dynamo connected in circuit with the field thereof, and a dynamo-electric machine acting upon said field in opposition to said exciting dynamo and responsive to fluctuations therein.

12. In an electrical system of distribution, the combination of a regulating dynamo, an exciting dynamo connected in circuit with the field thereof, and a dynamo-electric machine in series in said circuit and responsive to fluctuations in said exciting dynamo.

13. In an electrical system of distribution, the combination of a regulating dynamo, a source of variable electromotive force in series with its field for exciting it, and a dynamo-electric machine for acting upon said field of said dynamo, having a magnetic circuit with much greater remanence than said dynamo.

14. In an electrical system of distribution, the combination of a regulating dynamo, a source of electromotive force in series with its field for exciting said field, and a dynamo-electric machine for acting upon said field in opposition to said source, said machine having a magnetic circuit of pronounced remanence.

15. In an electrical system of distribution, the combination of a regulating dynamo, an exciting dynamo connected in circuit with the field thereof, and a dynamo-electric machine in series in said circuit having a magnetic circuit of much greater remanence than said exciting dynamo.

16. In an electrical system of distribution, the combination of a regulating dynamo, an exciting dynamo connected in circuit with the field thereof, a dynamo-electric machine having its armature arranged to act upon said field, and connections for causing the field of said dynamo-electric machine to be responsive to fluctuations in the armature current of said exciting dynamo.

17. In an electrical system of distribution, the combination of a regulating dynamo, means for exciting the field of said dynamo and a dynamo-electric machine for acting upon said field responsive to fluctuations in said system, said machine having a magnetic circuit of much greater remanence than said dynamo.

18. In an electrical system of distribution, the combination of a regulating dynamo, opposing field coils therefor and a dynamo-electric machine in series with the armature of said dynamo, said machine having a magnetic circuit of much greater remanence than said dynamo.

19. In an electrical system of distribution, the combination of a regulating dynamo, and a dynamo-electric machine having field windings in series with its armature and acting in conjunction with said regulating dynamo, said machine having a magnetic circuit of much greater remanence than said dynamo.

20. In an electrical system of distribution, the combination of a regulating dynamo and a dynamo-electric machine acting in opposition thereto, the field of said machine being responsive to fluctuations in the armature of said dynamo and having a magnetic circuit of much greater remanence than said dynamo.

21. In an electrical system of distribution, the combination of a regulating dynamo and a dynamo-electric machine acting in opposition thereto, having its field responsive to fluctuations in said dynamo and having in its magnetic circuit a path of hard steel.

22. In an electrical system of distribution, the combination of a dynamo for regulating the strength of a field, a dynamo-electric machine having its armature arranged to act upon said field and having its field in series with said regulating dynamo, said dynamo-electric machine being provided with a magnetic circuit which becomes saturated with a small part of the current from said regulating dynamo.

23. In an electrical system of distribution, the combination of a regulating dynamo, means for producing an exciting current for the field of said dynamo, and a dynamo-electric machine for acting upon said field responsive to fluctuations in said system, said machine having a magnetic circuit which becomes saturated with a current much smaller than the contemplated value of said exciting current.

24. In an electrical system of distribution, the combination of a regulating dynamo and a dynamo-electric machine acting in opposition thereto, the field of said machine being responsive to fluctuations in the armature of said dynamo and having a magnetic circuit which becomes saturated with only a part of the current in the armature of said regulating dynamo.

25. The combination of a dynamo, means tending to excite the same with a variable magnetomotive force, and means arranged to oppose the action of said first named means to cause a reversal of the excitation of the dynamo as the magnetomotive force tending to be produced by said first named means approaches zero.

26. The combination of a dynamo, means tending to excite the same with a variable magnetomotive force, and means arranged to oppose the action of said first named means to cause a reversal of the excitation of the dynamo as the magnetomotive force tending to be produced by said first named means approaches zero, said last mentioned means including a source of electromotive force and means arranged to cut down its opposing action as the magnetization of the dynamo approaches zero.

27. The combination of a dynamo, means tending to excite the same with a variable magnetomotive force, and means arranged to oppose the action of said first named means to cause a reversal of the excitation of the dynamo as the magnetomotive force tending to be produced by said first named means approaches zero, said last mentioned means including a second dynamo arranged to produce a comparatively small demagnetizing action upon said first dynamo and to reverse the excitation of said first dynamo as said first named means tends to produce a magnetomotive force approaching zero.

28. The combination of a dynamo, means tending to excite the same with a variable magnetomotive force, and means arranged to oppose the action of said first named means to cause a reversal of the excitation of the dynamo as the magnetomotive force tending to be produced by said first named means approaches zero, said last mentioned means including a second dynamo arranged to produce a comparatively small demagnetizing action upon said first dynamo and to reverse the excitation of said first dynamo as said first named means tends to produce a magnetomotive force approaching zero, said second dynamo being provided with a winding arranged to be excited to cut down its own magnetization as the magnetization of the first dynamo approaches zero.

29. In an electrical system of distribution, a distribution circuit, a storage battery in operative relation thereto, a regulating dynamo for the battery, means tending to excite the same with a magnetomotive force responsive to variations in the electrical condition of the system, and means arranged to oppose the action of said first named means to cause a reversal of the excitation of the dynamo as the magnetomotive force tending to be produced by said first named means approaches zero to remove remanent magnetism from said dynamo.

30. In an electrical system of distribution, a distribution circuit, a storage battery in operative relation thereto, a regulating dynamo for the battery, means tending to excite the same with a magnetomotive force responsive to variations in the current of said circuit of the system, and means arranged to oppose the action of said first named means to cause a reversal of the excitation of the dynamo as the magnetomotive force tending to be produced by said first named means approaches zero to remove remanent magnetism from said dynamo, said last mentioned means including a second dynamo arranged to produce a comparatively small demagnetizing action upon said first dynamo and to reverse the excitation of said first dynamo as said first named means tends to produce a magnetomotive force approaching zero.

31. In an electrical system of distribution, a distribution circuit, a storage battery in operative relation thereto, a regulating dynamo for the battery, means tending to excite the same with a magnetomotive force responsive to variations in the electrical condition of the system, and means arranged to oppose the action of said first named means to cause a reversal of the excitation of the dynamo as the magnetomotive force tending to be produced by said first named means approaches zero to remove remanent magnetism from said dynamo, said last mentioned means including a second dynamo energized by a coil connected to be responsive to variations in the electrical condition of the system and constructed to have its field become saturated with only a small portion of the current designed to flow through said coil.

In testimony whereof, I have signed my name to this specification, in the presence of two subscribing witnesses.

WILLIAM A. TURBAYNE.

Witnesses:
T. M. PATTERSON,
W. H. PATTENDEN.